United States Patent [19]

Wilkinson

[11] Patent Number: 5,616,675
[45] Date of Patent: Apr. 1, 1997

[54] PROCESS OF PREPARING ELASTOMERIC THREAD

[76] Inventor: Kenneth Wilkinson, 1010 Glenwood Blvd., Waynesboro, Va. 22980

[21] Appl. No.: 385,688

[22] Filed: Feb. 8, 1995

[51] Int. Cl.$^6$ .......................... C08G 18/42; C08G 18/48; C08G 18/10; B29C 47/00
[52] U.S. Cl. .............................. 528/61; 264/83; 264/167; 264/211.14; 264/211.16; 264/211.24; 428/364; 528/76; 528/80; 528/906
[58] Field of Search .................................. 528/61, 76, 80, 528/906; 264/167, 211.14, 211.16, 211.24, 83; 428/364

[56] References Cited

U.S. PATENT DOCUMENTS

| | | | |
|---|---|---|---|
| 2,935,372 | 5/1960 | Steuber | 264/83 |
| 3,424,828 | 1/1969 | Harris et al. | 264/211.16 |
| 3,453,357 | 7/1969 | Logan, Jr. | 264/83 |
| 3,509,102 | 4/1970 | Horn et al. | 528/61 |
| 3,607,365 | 9/1971 | Lindlof | 427/213 |
| 3,940,542 | 2/1976 | Knopf et al. | 528/61 |
| 4,871,818 | 10/1989 | Lodoen | 528/61 |
| 4,973,647 | 11/1990 | Bretches et al. | 528/61 |
| 5,061,426 | 10/1991 | Frauendorf et al. | 528/61 |

*Primary Examiner*—Rabon Sergent
*Attorney, Agent, or Firm*—Leander F. Aulisio

[57] ABSTRACT

A continuous solventless process for preparing elastomeric polyurethane/urea filaments and fibers in a vertical spinning tower and product prepared therefrom.

10 Claims, 1 Drawing Sheet

5,616,675

PROCESS OF PREPARING ELASTOMERIC THREAD

BACKGROUND OF THE INVENTION

Spandex fibers are polyurethane/urea fibers composed of molecular chains which have hard and soft segments. The fibers are elastomeric and have very high extensibility to break (400% to 800%). The fibers also have high recovery from stretching. Spandex fibers are stronger and lighter than rubber. The fibers, which are white and dyeable, can be drawn (stretched) during or subsequent to spinning. Monofilaments are obtained from a spinneret with a single hole.

In prior art processes, the manufacture of elastomeric threads for textile uses has been achieved by reacting glycols of polyethers or polyesters with organic diisocyanates to make polyurethane pre-polymers having residual isocyanate groups located on most of the pre-polymer ends. The polyurethane pre-polymers are dissolved in solvents to give a 25% to 40% solids solution with a controlled viscosity. The mixture of pre-polymer and solvent is then contacted with an organic diamine and optionally, a small amount of secondary amine to obtain large molecules of elastomer in solution. Filaments are formed by evaporating the solvent (dry spinning) or by coagulation (wet spinning).

Prior art processes are limited by the need for producing pre-polymers which are soluble in some organic solvent to an extent of greater than 15% solids. Only certain diisocyanates can therefore be employed for reaction with glycols of polyethers or polyesters. Some diisocyanates which produce superior resistance to sunlight or to harsh chemicals such as chlorine cannot be employed because they yield unsuitable pre-polymers, i.e., pre-polymers not soluble in liquids for reaction with diamines, or the reaction product with diamines is insoluble.

Prior art processes require addition of solvent in order to keep the viscosity of the elastomer low enough for spinning through small spinneret holes. The use of solvent requires high energy costs for solvent removal, recovery and purification.

Prior art processes such as dry spinning have speeds that are dependent on rate of solvent removal. Speeds are carefully regulated to keep filaments from sticking together, or to provide sticking of tiny filaments in immediate proximity of each other to form high denier fibers at high spinning speed. When several threads are produced in the same spinning cell, a problem arises relating to adjacent threads sticking together.

Prior art processes involving wet spinning include relatively slow spinning speeds of about 50 meters/minute and produce elastomeric threads having poor physical properties due in part to lack of a high degree of orientation of elastomeric molecules. In addition, the elastomeric products must be "heat set", which is an expensive and inconsistent process U.S. Pat. No. 2,935,372 (Steuber) relates to a process for preparing fibers and filaments by extruding an intermediate macromolecular composition through an orifice blanketed by an inert gas and into the vapors of a monomeric intermediate. The macromolecular intermediate can be an isocyanate-terminated polyalkylene oxide (column 2, lines 30–75) and the monomeric intermediate can be ethylenediamine. The concentration of the diamine is about 1000 ppm The solid filament is wound up at speeds of about 50 to 175 y.p.m. (yards per minute) to obtain a product having a low tenacity of 0.2 grams per denier, an elongation of 500% and a 94% recovery from tensile elongation. Also disclosed is a cross flow of inert gas at the face of the spinneret to prevent reaction immediately contiguous to the spinneret face (column 6, line 66). The fibers which are produced have a uniform cross-section (page 8, line 34). Also, a delicate balance of reactant materials is not maintained (page 8, line 54).

U.S. Pat. No. 3,115,384 (Cacella et al.) relates to a method of making a filament comprising contacting a liquid polyurethane prepolymer having terminal isocyanate groups with a primary aliphatic diamine in a setting bath complete with hydroxyl-containing solvent to effect a setting to the solid state of the external surface only of the liquid prepolymer. The interior of the filament which remains fluid is then treated under anhydrous conditions and at a specified temperature to effect setting to a solid state.

U.S. Pat. No. 3,666,708 (Nakahara et al.) relates to a method of preparing a chain-extended polyurethane from a prepolymer having terminal isocyanate groups, a bi-functional chain-extending agent and N,N-dialkylalkylene diamine.

U.S. Pat. No. 3,753,953 (Jan Leenwerik et al.) relates to a method of preparing a polyurethane elastomer comprising reacting a diisocyanate with a polyester to obtain a polyurethane prepolymer, and subsequently reacting the polyurethane prepolymer with a diamine chain extender. The reaction of prepolymer with chain extender takes place in an aprotic polar solvent such as dimethyl formamide and the like.

In spinning from solvents, physical properties change with different spinning speeds. In the disclosed solventless process, spinning speeds can vary over a wide range without changing the physical properties of the fiber. Physical properties of the fiber prepared according to the present process can be changed simply by changing the concentration of the diamine in the inert gas surrounding the prepolymer in the spinning tower.

SUMMARY OF THE INVENTION

The present process comprises forming a polyurethane/ urea polymer thread by preparing a urethane prepolymer by reacting a first reactant which is a member selected from the group consisting of a polyester-diol and a polyether-diol with a second reactant which is a diisocyanate. The urethane prepolymer is then contacted with a controlled amount of diamine in gaseous phase at the face of a spinneret to obtain a non-tacky polyurethane/urea thread which has a discontinuous cross-section. The thread can be spun at a rate of about 200 to 1,000 meters per minute.

The term "thread" is meant to include continuous mono- and multi-filaments, staple fibers, skeins and the like.

Other advantages of the present process as disclosed are that the elastomeric threads need no treatment before shipping such as "heat setting". Also threads of different elongations can be easily produced without changing the composition of the glycols of polyethers or polyesters or the composition of the organic diamine. In the present process the elongation and composition of the product can be varied in less than one minute by adjusting the flow and concentration of the gaseous organic diamine.

In a preferred embodiment, a solid shaped body of discontinuous cross-section is prepared in an apparatus which comprises a holding tank for a glycol reagent, a holding tank for a diisocyanate reagent, and a line for transporting the glycol and diisocyanate to a mixing chamber whereby the glycol reacts with diisocyanate to produce a prepolymer. The apparatus further comprises a line for removing the prepolymer to a storage tank and a line for transporting prepolymer to a second reactor whereby the prepolymer is reacted with a diamine chain-extending agent in a predetermined amount and under controlled conditions.

DETAILED DESCRIPTION OF THE INVENTION

Figure 1:
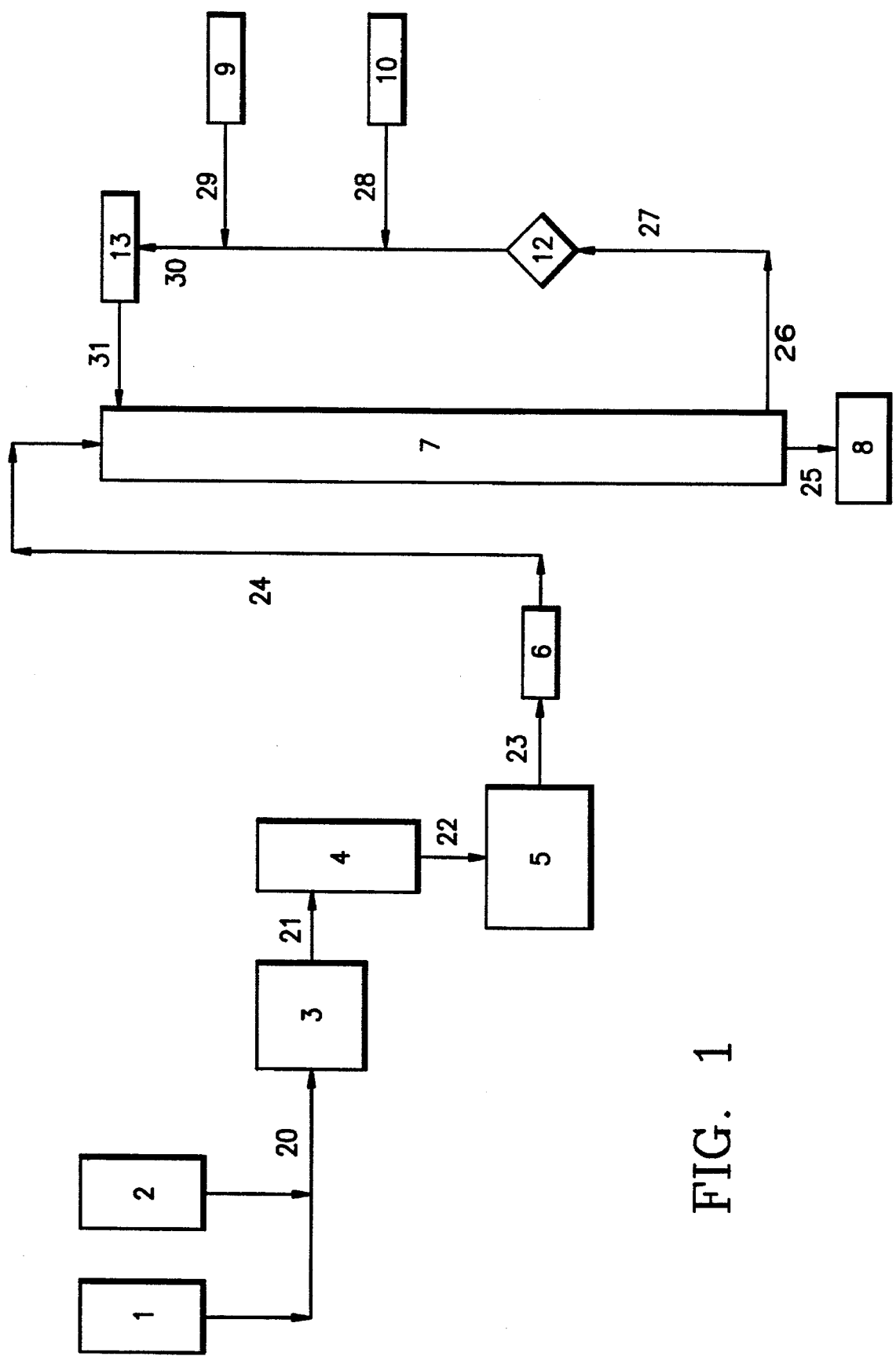
FIG. 1 is a flow diagram of a solvent-free process for preparing polymer fibers.

The liquid polyurethane prepolymer employed in the invention is typically derived from a polymer of molecular weight from 300 and up, preferably 1500 to 5000, having terminal alcoholic hydroxyl groups. Such polymer can be a chain extended polyester made from a glycol, preferably a mixture of ethylene and butylene glycols, and a saturated organic dicarboxylic acid, preferably adipic acid. Usually, the glycol contains 2 to 20 carbon atoms. Typical examples of such glycols include ethylene glycol, propylene glycol, 1,6-hexanediol, 1,4-butanediol, neopentyl glycol, diethylene glycol, thiodiglycol, 2,2'-dimethyl-1,3-propylene glycol, etc. The acid usually contains 4 to 20 carbon atoms. Typical examples include succinic acid, maleic acid, dihydromuconic acid, thiodipropionic acid, adipic acid, methyl adipic acid, glutaric acid, dimerized linoleic acid, sebacic acid suberic acid, phthalic acid, and terephthalic acid. To some extent hydroxycarboxylic acids or their lactones can be used, e.g., caprolactone, to aid in forming the polyesters. As stated, mixtures of various dibasic acids and glycols can be used to form mixed esters.

An excess of the glycol over the acid is used in preparing the polyesters so that the resulting polyester contains terminal hydroxyl groups. Usually such an amount of glycol is used as to give a polyester having a hydroxyl number of 20 to 225 and preferably 36 to 75, and a low acid value, e.g., less than 6 and preferably less than 1. The molecular weight of the polyester usually ranges from 500 to 5000 and preferably 1500 to 3000. In general, the most suitable polyesters are chiefly linear with melting point levels of 90° C. or lower and preferably not over 60° C. Less suitably natural polyesters can be used, e.g., castor oil, as well as blown drying oils such as blown tung oil, linseed oil and soya oil.

Other examples of suitable polyesters for use in preparing the prepolymer are polyethylene adipate, polyethylene adipatephthalate and polyneopentyl sebacate. Small amounts of trialcohols such as trimethylolpropane or trimethylolethane may be included in preparing the glycoldicarboxylic acid polyesters and such modified forms of polyester are included within the term polyester as used herein.

As an alternative to the polyesters there may be used for reaction with the diisocyanate one or more elastomer yielding polyethers. Such polyethers are typically anhydrous chain extended polyethers possessing ether linkages separated by hydrocarbon chains either alkyl or aryl in nature. The ether should also contain terminal groups reactive to isocyanate, such as alcoholic hydroxyl groups. Such polyethers may be linear or branched. Usually the polyethers are chiefly linear with a melting point of not over 90° C., preferably not over 60° C. The molecular weight range is from 500 to 5000, but preferably is within the range of 750 to 3,500; hydroxyl number of 225 to 22, (hydroxyl number of 150 to 45 preferred). Preferred polyethers have the formula $H(OR)_nOH$ where R is a lower alkylene group (2 to 6 carbon atoms) and n is an integer so that the molecular weight falls within the range specified. Examples of polyethers are polyethylene glycol, polypropylene glycol, polybutylene glycol, mixed polyethylene glycol-polypropylene glycol, polytetramethylene glycol (e.g., of 1000 molecular weight).

Polyethers not only can be used in place of the polyesters but can be used in conjunction therewith. Examples of such compounds are polydiethylene glycol adipate and polytriethylene glycol adipate. Further examples of polyesters and polyethers which are suitable are set forth in Kohrn Patent 2,953,839 and the patents cited therein in column 2, lines 56–68.

The polyester or polyether (including polyether-ester) is reacted or "capped" with a diisocyanate, preferably an aromatic diisocyanate, using a molar ratio of 1.3–2.1 moles of diisocyanate to 1.0 mole polyester (or polyether) glycol; and preferably about 1.35:1 to about 1.85:1 molar ratio of diisocyanate to polyester (or polyether) glycol. The reaction is frequently effected by mixing the polyester or polyether with a diisocyanate either at room temperature, or at a moderately elevated temperature, e.g. 70° to 150° C., to form an uncured liquid prepolymer which is soluble in methyl ethyl ketone. The prepolymer is essentially a linear polyurethane having predominantly terminal isocyanate groups. The reaction is preferably carried out at 90° to 100° C.

Representative of the preferred aromatic diisocyanates which may be mentioned, by way of non-limiting examples are m- and p- phenylene diisocyanate, tolylene diisocyanate (65% 2,4 and 35% 2,6), p,p'-diphenyl diisocyanate, 1,5-naphthalene diisocyanate, p,p'-diphenyl-methane diisocyanate, 3,3'-bitolylene-4,4'-diisocyanate, 2,4-tolylene diisocyanate dimer, dianisidine diisocyanate, 4-chloro-1,3-phenylene diisocyanate. Aliphatic and cycloaliphatic diisocyanates can also be used such as 1,4-tetramethylene diisocyanate, 1,6-hexamethylene diisocyanate, 1,10-decamethylene diisocyanate, 1,4-cyclohexylene diisocyanate, 4,4'-methylene-bis (cyclohexylisocyanate) and 1,5-tetrahydronaphthalene diisocyanate. Other diisocyanates can be employed including those set forth in the Kohrn patent, as well as those mentioned in the patents set forth in Kohrn. The preferred diisocyanate is tolylene diisocyanate.

As suitable amines there can be used ethylene diamine, hexamethylene diamine, 1,4-diaminocyclohexane, p-phenylenediamine, 3,3'-diaminodipropyl ether, diaminodibutyl sulfide, propylene diamine. The amines have the formula $H_2N—A—NH_2$, where A is a divalent organic radical in which the terminal atoms are carbon, and which is devoid of groups reactive with isocyanate. The preferred diamine is ethylene diamine.

FIG. 1 illustrates the present continuous process which comprises maintaining a supply of glycol-terminated polyester (or polyether) in storage tank 1, maintaining a supply of diisocyanate material in storage tank 2, transporting both the polyester (or polyether) and the diisocyanate material as by line 20 to a mixing device 3, and preparing a reactive mixture of the polyester (or polyether) and the diisocyanate. The mixture is passed as by line 21 to a first reaction zone 4 where the polyester (or polyether) and the diisocyanate are reacted under suitable conditions of temperature and pressure to obtain an isocyanate-terminated polyurethane prepolymer.

The polyurethane pre-polymer is passed as by line 22 to a storage tank 5 for future use. When continuous production of elastomeric Spandex thread is desired, an amount of prepolymer is withdrawn from the storage tank 5 and passed to pump 6 as by line 23. The prepolymer is pumped through line 24 to a second reaction zone 7, also known as a spin tower, where the liquid prepolymer is forced through a plurality of holes in a spinneret located at the top of the spin tower. The prepolymer is contacted with a gaseous organic diamine upon exit from the spinneret holes, and a chemical chain-extending reaction occurs to obtain a polyurethane/urea elastomeric fiber having a chemically discontinuous cross-section. The gaseous diamine reacts with the prepolymer in milliseconds to produce a non-tacky, very fine fiber which is withdrawn from the spin tower 7 as by winders 8 along line 25 at a speed of about 200 to 1,000 meters per minute. The residence time of the prepolymer in the second reaction zone 7 is less than about one second. In a preferred embodiment, the diamine reacts with the polyurethane prepolymer in about 5 to 50 milliseconds.

The diamine is supplied to the spin tower 7 from supply tank 10. Liquid diamine is metered from tank 10 as by line 28. Nitrogen gas, air or one of the nobel gases is withdrawn from supply tank 9 as by line 29. Both the nitrogen gas and the diamine gas are passed to heater 13 as by line 30. A dilute mixture of gas and diamine in a concentration of about 50 to 2000 ppm, preferably 50 to 500 ppm, based on weight of diamine is passed to the top of second reactor 7 as by line 31. The diamine reacts with the prepolymer in milliseconds from the outside of the fiber to produce elastomeric fibers which require no heat setting process prior to shipment. The composition of the final elastomeric product is controlled by the rate of flow of diamine and the concentration of the diamine, the rate of flow of prepolymer and concentration of isocyanate in the prepolymer. Both the rate of flow and the concentration of diamine can be altered in the process in less than about one minute in a continuous operation. Products having a different degree of elongation can be obtained in a matter of minutes without cleaning the spin tower and related equipment.

Unreacted diamine can be withdrawn from the spin tower 7 as by line 26. The diamine is then passed to fan 12 as by line 27, and combined with fresh diamine in line 30 for transport to heater 13. The unreacted diamine is then recycled to second reactor 7 through line 31 for further reaction with the prepolymer to form urea chain extending.

The present inventive process is an improvement in forming a shaped solid body such as a fiber or filament which has a cross section. The material for the shaped body is formed by reaction of a prepolymer and a vaporous diamine. The prepolymer is prepared from a monomeric diisocyanate and a polymeric or oligomeric polyester-polyol (glycol-capped polyester), polyether-polyol or a mixed polyester-polyether-polyol. The reaction is accomplished by extrusion of the prepolymer through an orifice blanketed by an inert gas into the vapors of the diamine chain-extender. The improvement comprises adjusting the concentration of the diamine, the flow rate of the diamine, and the ratio of diamine to the isocyanate-terminated prepolymer to obtain, after spinning, a solid shaped body having a discontinuous cross section.

Non-tacky, fine, large mono-filaments of polymer are withdrawn from the spinnerets as by a winding apparatus operated at a speed of 600 meters per minute and a temperature of about 25° C. to 40° C. The spinneret holes are 0.20 mm in diameter. Filaments can be spun and coalesced from holes placed closely together to obtain large denier fibers (above 70 denier). In the solventless process, skin forms quickly on the surface of the fibers near the face of the spinneret, and therefore there is less sticking of the filaments from adjacent holes.

The process of the present invention controls the viscosity of the polymeric material at the spinneret. Polymeric material is always changing in composition as the molecular weight builds. The present inventive process employs at the spinneret a very spinnable polymeric material having a composition of 100% solids and a low viscosity of about 300 poise. The molecular weight of the material increases dramatically upon exit from the spinneret. In prior art processes, the viscosity of the spinning solution is built before the fiber leaves the spinneret.

The present process as disclosed has numerous advantageous features not found in the prior art. Any diisocyanate can be employed as a reactant to contact the glycols of polyethers or polyesters. No solvent is employed at any point in the process. The spinning process can be performed at room temperature. The gas phase diamine reacts with the pre-polymer in milliseconds to obtain a non-tacky filament. Very fine filaments are prepared, or, if desired, large mono-filaments can be obtained. The formed filaments have a chemical difference between the shell and the core, the shell having a larger amount of free amine groups. The free amine groups allow for attachment of dyes, antistatic agents, softening agents, UV screening agents, antioxidants and the like. The filaments also have a shell that has a lower molecular weight than the core.

There is no sharp division between core and shell, as the core and shell gradually blend into each other. The shell has a large proportion of amine groups, and there is a continuous increase in amine groups from the center of the fiber to the shell. At the center of the fiber, the free amine content is less than about 40 meq/kg; and at the surface or outer shell of the fiber, the free amine content is greater than about 100 meq/kg. In an alternative description, the cross-section of the fiber has an increasing free-amine content along the radius vector. The radius vector is defined as the geometric extension of points from the center of the circle, formed by obtaining a cross-section of the fiber, to a point on the circle. It has both magnitude (the length of the radius of the circle) and direction. In like manner, the cross-section of the fiber has decreasing free-isocyanate content along the radius vector. And finally, the cross-section of the fiber has decreasing molecular weight along the radius vector.

The product produced by the disclosed process has properties which are not common to prior art Spandex fibers. The stress/strain curve is different and the present fibers exhibit a rapid rise in tenacity near the break.

The process as described above is economically efficient and environmentally friendly. A high-quality, easily dyeable Spandex elastomeric fiber is produced. Use of environmentally hazardous organic solvents is eliminated.

An apparatus for preparing a solid shaped body of discontinuous cross-section is hereby disclosed. The apparatus comprises a holding tank 1 for the glycol reagent, a holding tank 2 for the diisocyanate reagent, a line 20 for transporting the glycol and diisocyanate to the mixing chamber 3, a line 21 for transporting the mixture of glycol and diisocyanate to a first reactor 4 for producing an isocyanate-terminated prepolymer, a line 22 for removing the prepolymer to a storage tank 5, a line 23 for delivering the prepolymer through a pump 6 and through line 24 to a second reactor 7, a storage tank 10 for maintaining a supply of liquid diamine chain-extending agent, a line 28 for transporting diamine, a heater 13, a line 31 for transporting diamine and gas to reactor 7, a winder apparatus 8 for taking up elastomeric fibers, a line 26 for recycling unreacted diamine, a fan 12, and a line 30 for transporting recycled diamine to heater 13. The unreacted diamine can be recycled along with inert diluent gas.

In the present process, the mole ratio of diamine chain extender to isocyanate present in the polyurethane prepolymer is controlled to be in the range of about 0.7:1 to about 1.2:1. The ratio refers to the moles of amine groups within the diamine compound. In a preferred embodiment, the mole ratio of diamine to isocyanate in prepolymer is about 0.8:1 to about 1:1. In a most preferred embodiment, the mole ratio of diamine to prepolymer is about 0.94:1 to about 0.98:1.

The concentration of diamine chain extender in the inert carrier gas is controlled (to ±5% relative) to be in the range of about 50 ppm to about 2000 ppm, based on weight depending upon the flow rate of prepolymer. In a preferred embodiment, the optimum concentration of diamine in the inert gas can be calculated based on the amount of prepolymer being spun, the inert gas recirculation rate and the inert gas flow rate. Amount of prepolymer being spun can be calculated based on the denier of each thread, the number of threads, the wind-up speed and the molecular weight of the prepolymer. Two factors which control the production of elastomeric fibers having a non-uniform cross-section (rather than a uniform cross-section) are the mole ratio of diamine to isocyanate in the prepolymer and the concentration of diamine in the inert gas surrounding the fibers.

Denier is defined as the weight of the fiber product in grams divided by 9,000 meters of fiber. Power is defined as the pull-back strength of the fiber upon elongation. It is also known as the tenacity of the fiber. The units of power are grams/denier.

The power of a fiber is calculated based on the number of times the fiber is stretched or elongated and the degree of elongation. The first cycle refers to the initial stretching of the fiber. The first part of the stress-strain curve refers to that part of the curve falling within about 10% to about 50% elongation. This first part of the curve is important because it is what is normally encountered in the day-to-day wearing of fabrics. Clothing is not normally stretched to 100% up to 500% elongation, but is in the range up to about 100% elongation.

Table 2 refers to the stress-strain curves for two commercial products (Lycra T-126 and Lycra T-128) and for three products prepared according to the present process (A, B, C). The stress-strain curves for Lycra T-126 at 40 denier and for product C at 40 denier are similar. The Lycra T-126 fiber breaks at 420% elongation with a tenacity of 0.9 g/denier. The product C fiber breaks at 333% elongation with a tenacity of 0.8 g/denier.

TABLE 2

RETENTION OF PROPERTIES OF FIBERS
UPON REPEATED STRETCHING
(gm/denier)

|  | *Lycra T-126 | *Lycra T-128 | **A | **B | **C |
|---|---|---|---|---|---|
| 1st Cycle |  |  |  |  |  |
| 100% Elongation | 0.06 | 0.07 | 0.07 | 0.07 | 0.08 |
| 200% Elongation | 0.12 | 0.11 | 0.11 | 0.13 | 0.13 |
| 5th Cycle |  |  |  |  |  |
| 100% Elongation | 0.016 | — | 0.019 | 0.017 | 0.017 |
| 200% Elongation | 0.027 | — | 0.032 | 0.029 | 0.037 |

TABLE 2-continued

RETENTION OF PROPERTIES OF FIBERS
UPON REPEATED STRETCHING
(gm/denier)

|  | *Lycra T-126 | *Lycra T-128 | **A | **B | **C |
|---|---|---|---|---|---|
| 300% Elongation | 0.17 | 0.10 | 0.12 | 0.14 | 0.24 |
| Break | 0.9 | 0.5 | 0.4 | 0.5 | 0.8 |

*Lycra T-126 contains polyether soft segment. Lycra T-128 contains polyester soft segment. Both T-126 and T-128 are chain extended with ethylene diamine. T-126 is 40 denier and T-128 is 80 denier.
**A, B, and C are polymers prepared from polybutylene glycol 2000 and methylene bis(4-phenyl isocyanate), and chain extended with ethylene diamine. The spinning speed is 300 meters/minute; the number of filaments per thread is 5; the %-age of free isocyanate in the polymers is 2.5, the amount of ethylene diamine chain extender is 80 ppm; and the flow of nitrogen gas is 2.0 cu. meters per minute. Polymer A is heat set at 180° C. for 90 seconds. Polymers A and B are 140 denier. Polymer C is 40 denier.

Table 3 relates to the first cycle of the stress-strain curve for two commercial products (Lycra T-126 and Lycra T-128) and for four products prepared in accord with the present process (E, F, G and H). At 50% elongation, product E has superior tenacity (0.066 g/denier) as compared to Lycra T-126 (0.054 g/denier) and Lycra T-128 (0.026 g/denier).

TABLE 3

FIRST CYCLE STRESS-STRAIN CURVE
(g/denier)

|  | *Lycra T-126 | *Lycra T-128 | **E | **F | **G | **H |
|---|---|---|---|---|---|---|
| 10% Elongation | 0.0145 | 0.005 | 0.022 | 0.011 | — | — |
| 20% Elongation | 0.027 | 0.007 | 0.044 | 0.02 | — | — |
| 30% Elongation | 0.04 | 0.015 | 0.054 | 0.032 | — | — |
| 40% Elongation | 0.05 | 0.022 | 0.06 | 0.04 | — | — |
| 50% Elongation | 0.054 | 0.026 | 0.066 | 0.046 | — | — |
| 60% Elongation | 0.04 | 0.03 | — | — | 0.03 | 0.03 |
| 70% Elongation | 0.08 | 0.04 | — | — | 0.08 | 0.05 |
| 80% Elongation | 0.34 | 0.10 | — | — | 0.44 | 0.15 |
| 90% Elongation | 0.84 | 0.19 | — | — | — | 0.34 |
| 100% Elongation | — | 0.44 | — | — | — | — |

*Lycra T-126 is 40 denier. Lycra T-128 is 55 denier
**E, F, G and H are polymers prepared from polybutylene glycol 2000 and methylene bis(4-phenyl isocyanate), and chain extended with ethylene diamine. The spinning speed is set at 300 meters per minute; the number of filaments per thread is 5; the %-age of free isocyanate groups in the polymer is 2.5; the amount of ethylene diamine chain extender is 60 ppm (E), 360 ppm (F), 70 ppm (G) and 90 ppm (H); the flow of nitrogen gas is 2.2 cu. meters per minute (E and F) and 1.9 cu. meters per meters per minutes (G and H). Polymers E and F are 40 denier. Polymers G and H are 45 denier.

Table 4 relates to stress-strain curves for four commercial products and one product prepared according to the present process (J). Fifth cycle properties of the fibers are disclosed in terms of tenacity. At 100%, 200% and 300% elongation, the tenacity of the fiber J (spun at 300 meters/minute) compares favorably with the tenacity of the four Lycra fibers (spun at either 300 meters/minute or 600 meters/minute).

TABLE 4

FIFTH CYCLE PROPERTIES
(g/denier)

| Elongation | *Lycra T-126A | *Lycra T-126B | *Lycra T-126C | *Lycra T-126D | **Polymer J |
|---|---|---|---|---|---|
| 100% | 0.03 | 0.03 | 0.03 | 0.03 | 0.03 |
| 200% | 0.12 | 0.06 | 0.04 | 0.05 | 0.06 |
| 300% | 0.28 | 0.18 | 0.08 | 0.11 | 0.19 |

TABLE 4-continued

| | FIFTH CYCLE PROPERTIES (g/denier) | | | | |
|---|---|---|---|---|---|
| Elongation | *Lycra T-126A | *Lycra T-126B | *Lycra T-126C | *Lycra T-126D | **Polymer J |
| 400% | 0.8 | 0.44 | 0.22 | 0.30 | — |
| 500% | — | 0.72 | 0.44 | 0.55 | — |

*Lycra T-126A is 40 denier. Lycra T-126B is 140 denier. Lycra T-126C is 40 denier, spun at 300 meters per minute and is composed of 5 filaments per thread. Lycra T-126D is 140 denier, spun at 300 meters per minute and is composed of 5 filaments per thread.
**Polymer J is 70 denier. It is spun at 300 meters per minute, is composed of 5 filaments per thread, has a free isocyanate content of 2.5%, is chain extended with 70 ppm ethylene diamine. The flow of nitrogen during chain extension is 1.9 cu. meters per minute.

Table 5 relates to concentration curves for fibers prepared according to the present process. Concentration of ethylene diamine chain extender in nitrogen carrier gas ranges from 60 ppm to 95 ppm, based on weight. The tenacity of the fibers, which are prepared at various diamine concentrations, is measured at various times and conditions such as: immediately after spinning, 24 hours after spinning, after heat setting and after immersion in boiling water. The fibers are prepared from polybutylene glycol 2000 and methylene bis(4-phenyl isocyanate), and chain extended with ethylene diamine. Completeness of the chain extension reaction after 24 hours at room temperature is demonstrated by uniform break tenacity (approximately 0.35 denier), regardless of diamine concentration (60 ppm–95 ppm), based on weight. Immersion of the various fibers (prepared with different ethylene diamine concentrations in nitrogen) in boiling water does not affect the uniformity in tenacity (0.48 g/denier) among the fibers. This demonstrates, once again, the completeness of the chemical chain extension reaction.

TABLE 5

| | EFFECT OF DIAMINE CONCENTRATION (Breaking Tenacity, grams/denier) | | | |
|---|---|---|---|---|
| Ethylene Diamine | *Polymer K After Spinning | *Polymer K 1 day lag at room temp. | *Polymer K Heat set at 180°/90 seconds | *Polymer K Boiled in water 5 minutes |
| 60 ppm | 0.30 | 0.34 | 0.33 | — |
| 70 ppm | 0.33 | 0.34 | 0.42 | — |
| 80 ppm | 0.36 | 0.34 | 0.48 | 0.47 |
| 90 ppm | 0.30 | 0.34 | — | 0.47 |
| 100 ppm | 0.28 | 0.34 | — | 0.47 |

*Refers to ppm of ethylene diamine in nitrogen gas, all fibers made under same conditions (see example 3): 5 filaments, 40 denier, 300 meters/minute, $N_2$ flow = 1.9 cu. meters/minute.
*Polymer K has a denier of 40. It is composed of 5 filaments per thread, and is taken up at a spinning speed of 300 meters per minute. The amount of free isocyanate groups in the polymer is 2.5%, and the flow of nitrogen during chain extension reaction is 1.9 cubic meters per minute.

The following examples are not included as limiting the invention, but are given to further explain the present process.

EXAMPLE 1

Polybutylene glycol (1.8 kg) having a molecular weight of 1800 is reacted in a stirred reactor with methylene bis(4-phenylisocyanate) (0.425 kg) under a nitrogen atmosphere at a temperature of 100° C. for a time of 1 hour. The reaction is completed when the isocyanate content has decreased from about 6.0% by weight to about 2.5% by weight. After completion of the reaction, the clear, colorless product is cooled to 50° C. and stored under anhydrous conditions at a temperature of about 50° C. to 60° C. The solution can be used later as prepolymer for spinning. The solution contains about 70% of prepolymer having both end groups as isocyanates and about 30% of prepolymer having one end as isocyanate functionality and the other end as hydroxyl functionality.

EXAMPLE 2

The prepolymer of Example 1 is added as by a metering pump to a vertical reactor having a length of 7 meters. The solution is delivered to spinnerets at a temperature of about 40° C. to about 60° C., where it is contacted with a gaseous mixture of ethylene diamine and nitrogen which flows through inlets located near the spinnerets. The solution has a relatively low viscosity as it passes through the spinnerets, and viscosity is built after emergence of prepolymer from spinnerets to obtain a high polymer. The gaseous mixture contains about 50 to 300 ppm of the diamine, based on weight. A nitrogen flow (without the diamine) is provided at the face of the spinnerets to prevent fouling. Spinneret holes are 0.20 mm in diameter. Four to eight filaments are spun and coalesced from the holes to prepare large denier threads (greater than 70 denier). A spinning speed of 600 meters/minute is maintained for wind up of final product. The product has a sheath which is high in free-amine content and a core which is low in free-amine content.

EXAMPLE 3

The formation of a Spandex fiber having a discontinuous cross-section is dependent upon the following variables: the ratio of diamine chain-extender to the free isocyanate groups in the prepolymer, the number of threads per cell, the spinning speed, the molecular weight of the diamine, the molecular weight of the polyol precursor, the ratio of isocyanate groups to hydroxyl groups in the prepolymer, and the molecular weight of the diisocyanate reactant.

Preferably, the concentration of the diamine in the mixture should be as low as possible. Also, the ratio of diamine to isocyanate in the prepolymer is preferably from about 0.96:1 to about 0.98:1. The diamine added to the recycle gas should be sufficient to maintain the diamine concentration at a specified level. It has been observed that the concentration of diamine in the spin tower is actually higher than the theoretical concentration because both the mixing of diamine in the inert gas and the consumption of diamine are less than ideal.

The present example illustrates a process for calculating gas flow in the spin tower of a mixture of diamine chain-extender and inert gas. The operator chooses the denier, the number of ends (threads per spin cell), the spinning speed, the rate of gas flow and the ratio of diamine to diisocyanate in the prepolymer. The concentration of the diamine in the gas is then calculated.

In the present example the denier is chosen to be 40. There are 16 threads per spin cell and the spinning speed is 400 meters/min. The amount of free isocyanate end groups in the prepolymer is 2.5% by weight (0.595 moles/kg). The equivalents of ethylene diamine crosslinker needed to react with the free isocyanate end groups is calculated to be 0.577 mole/kg (assuming a ratio of 0.97:1 of amine to free isocyanate).

The grams per minute of prepolymer exiting the orifice in the spin tower is calculated by multiplying the denier by the number of ends, and then multiplying the first product by the spinning speed to obtain a second product. In a final step, the second product is divided by 9000 to obtain a quotient which is the grams per minute of prepolymer. In the present case the quotient is 28.44 grams per minute of prepolymer (40×16×400=256,000; and 256,000÷9000=28.44).

To obtain the grams per minute of free isocyanate exiting the orifice in the spin tower, the amount of free isocyanate in the prepolymer is multiplied by the grams per minute of prepolymer. In the present case the grams per minute of free isocyanate is 0.711 (28.44×0.025=0.711 gm/minute). The equivalents (or moles) per minute of free isocyanate can be easily calculated based upon the grams per mole of the isocyanate moiety (42 g/mole). In this case the equivalents per minute of isocyanate (in the prepolymer) is calculated to be 0.0169 equivalents/minute (0.711÷42=0.0169).

In the present example, the monomeric chain-extender is ethylene diamine (M.W.=60, or 30 per each amine group). The rate of flow of diamine chain-extender is readily calculated by multiplying the equivalents/minute of isocyanate by the grams/equivalent of amine groups. The product (assuming a 1:1 ratio of isocyanate to amine) is calculated to be 0.507 g/min. (30×0.0169=0.507). Since a ratio of 0.97:1 (amine:isocyanate) is desired in the present example, the rate of flow of ethylene diamine in the gaseous mixture is calculated to be 0.492 grams per minute.

If the operator desires a concentration of 500 ppm ethylene diamine in the gaseous mixture, the gas flow is readily calculated. The grams of ethylene diamine (per minute) in the gas flow is calculated to be 986 g/min. (0.492÷0.0005=986).

Although the present invention has been described in terms of a preferred embodiment, it will be understood that numerous modifications and variations could be made thereto without departing from the scope of the invention as set forth in the following claims.

What is claimed is:

1. A process for preparing an elastic thread comprising the steps of:

providing a liquid polyurethane prepolymer which is essentially a linear polyurethane having predominantly terminal isocyanate groups and which is the reaction product of a linear polymer having terminal hydroxyl groups which is a member selected from the group consisting of glycol-capped polyesters and glycol-capped polyethers with a diisocyanate wherein the mole ratio of diisocyanate to glycol-capped polymer is 1.3:1.0 to 2.1:1.0;

choosing denier, number of threads per spin cell, and spinning speed;

calculating equivalents of organic diamine crosslinker needed to react with free isocyanate end groups in the liquid prepolymer;

calculating grams per minute of prepolymer exiting an orifice in the spin tower;

calculating the equivalents (or moles) per minute of free isocyanate exiting the orifice in the spin tower;

calculating the rate of flow of diamine crosslinker;

choosing a concentration of diamine crosslinker in a mixture of inert gas and crosslinker;

calculating grams per minute of diamine crosslinker;

extending the prepolymer in the form of a filament into a gaseous mixture of an organic diamine and an inert gas wherein the mixture of diamine and inert gas has a concentration of about 50 to 2000 ppm of diamine, based on weight, and wherein the mole ratio of amine groups in the amine compound to free isocyanate groups in the prepolymer is about 0.7:1 to about 1.2:1 to obtain a fiber having a chemically discontinuous cross-section wherein the cross section of the fiber has decreasing molecular weight along the radius vector, increasing free-amine content along the radius vector, and decreasing free-isocyanate content along the radius vector; wherein the free-amine content is less than about 40 meq./kg. at the center of the fiber and greater than about 100 meq./kg. at the surface or outer shell of the fiber; and recovering an elastic thread.

2. A process according to claim 1 wherein the glycol-capped polyester or polyether is a member selected from the group consisting of polypropylene glycol, polybutylene glycol, polyethylene glycol, poly(butylene glycol) adipate, and poly(2,2-dimethylpropylene glycol) adipate.

3. A process according to claim 1 wherein the diisocyanate is a member selected from the group consisting of hexane diisocyanate isomers, cyclohexyl diisocyanate isomers, toluene diisocyanate isomers, and methylene-(bis-4-phenyl isocyanate).

4. A process according to claim 1 wherein the diamine has a vapor pressure above about 1 mm at 100° C. or a boiling point below 250° C. at atmospheric pressure.

5. A process according to claim 4 wherein the diamine is a member selected from the group consisting of ethylene diamine, N,N'-dimethylpropylene diamine, propylene diamine and isopropylene diamine.

6. A process according to claim 1 wherein the elastic thread is recovered at a spinning speed above about 200 meters per minute.

7. A process according to claim 1 wherein the elastic thread is a multi-filament or mono-filament.

8. A process according to claim 1 wherein the diamine reacts with the polyurethane prepolymer in less than one second.

9. A process according to claim 8 wherein the diamine reacts with the polyurethane prepolymer in a time of about 5 to 50 milliseconds.

10. A polyurethane/urea elastomeric fiber having a polymeric backbone containing polyester or polyether units and having a discontinuous cross-section wherein the cross-section of the fiber has decreasing molecular weight along the radius vector, increasing free-amine content along the radius vector and decreasing free-isocyanate content along the radius vector, wherein the free amine content is less than about 40 meq./kg. at the center of the fiber and greater than about 100 meq./kg. at the surface or outer shell of the fiber; and wherein the fiber is prepared from a liquid polyurethane prepolymer having predominantly terminal isocyanate groups and which is the reaction product of a linear polymer having terminal hydroxyl groups which is a member selected from the group consisting of glycol-capped polyesters and glycol-capped polyethers with a diisocyanate wherein the mole ratio of diisocyanate to glycol-capped polymer is 1.3:1.0 to 2.1:1.0; and wherein the prepolymer is contacted with a gaseous mixture of an organic diamine and an inert gas wherein the mixture of diamine and inert gas has a concentration of about 50 to 2,000 ppm of diamine, based on weight, and wherein the mole ratio of amine groups in the diamine compound to free isocyanate groups in the prepolymer is about 0.7:1 to about 1.2:1.

* * * * *